United States Patent
Hintzer et al.

(10) Patent No.: US 6,794,550 B2
(45) Date of Patent: Sep. 21, 2004

(54) METHOD OF MAKING AN AQUEOUS DISPERSION OF FLUOROPOLYMERS

(75) Inventors: Klaus Hintzer, Woodbury, MN (US); Gernot Löhr, Burgkirchen (DE); Albert Killich, Burgkirchen (DE); Werner Schwertfeger, Altötting (DE)

(73) Assignee: 3M Innovative Properties Company, St. Paul, MN (US)

( * ) Notice: Subject to any disclaimer, the term of this patent is extended or adjusted under 35 U.S.C. 154(b) by 425 days.

(21) Appl. No.: 09/914,507

(22) PCT Filed: Apr. 10, 2001

(86) PCT No.: PCT/US01/11628

§ 371 (c)(1),
(2), (4) Date: Aug. 28, 2001

(87) PCT Pub. No.: WO01/79332

PCT Pub. Date: Oct. 25, 2001

(65) Prior Publication Data

US 2002/0193500 A1 Dec. 19, 2002

(30) Foreign Application Priority Data

Apr. 14, 2000 (DE) .......................................... 100 18 853

(51) Int. Cl.$^7$ ............................. C08J 3/03; C08F 6/16; C08L 27/12
(52) U.S. Cl. ....................... 570/178; 524/462; 524/544; 524/545; 524/546; 526/911
(58) Field of Search ....................... 570/178; 524/462, 524/544, 545, 546; 526/911

(56) References Cited

U.S. PATENT DOCUMENTS

| | | | |
|---|---|---|---|
| 2,559,752 A | 7/1951 | Berry | 260/29.6 |
| 3,037,953 A | 6/1962 | Marks et al. | 260/29.6 |
| 3,142,665 A | 7/1964 | Cardinal et al. | 260/92.1 |
| 3,316,201 A | 4/1967 | Hahn et al. | 260/29.6 |
| 4,282,162 A | 8/1981 | Kuhls | 260/408 |
| 4,369,266 A | 1/1983 | Kuhls et al. | 523/332 |
| 4,609,497 A | 9/1986 | Cope | 260/408 |
| 4,623,487 A | 11/1986 | Cope | 260/408 |
| 5,219,910 A | 6/1993 | Stahl et al. | 524/236 |
| 5,312,935 A | 5/1994 | Mayer et al. | 554/182 |
| 5,442,097 A | 8/1995 | Obermeier et al. | 560/227 |
| 5,463,021 A | 10/1995 | Beyer et al. | 528/482 |
| 5,591,877 A | 1/1997 | Obermeier et al. | 554/226 |
| 5,998,521 A * | 12/1999 | Fan et al. | 524/225 |

FOREIGN PATENT DOCUMENTS

| | | | |
|---|---|---|---|
| EP | 0 030 663 B1 | 6/1981 | ......... C08F/259/08 |
| EP | 0 194 690 A2 | 9/1986 | ............ C08F/6/14 |
| EP | 0 731 081 B1 | 9/1996 | ........... C07C/53/21 |
| EP | 0 822 175 A2 | 2/1998 | ........... C07C/53/21 |
| WO | WO 97/08214 | 3/1997 | ........... C08F/14/26 |
| WO | WO 99/55746 | 11/1999 | ........... C08F/14/22 |
| WO | WO 99/62830 | 12/1999 | ............. C02F/1/58 |
| WO | WO 99/62858 | 12/1999 | ........... C07C/51/47 |
| WO | WO 00/35971 | 6/2000 | ........... C08F/14/18 |
| WO | WO 200035971 A * | 6/2000 | ........... C08F/14/18 |

OTHER PUBLICATIONS

"Encyclopedia of Industrial Chemistry Analysis", vol. 11, pp. 336 to 343, Interscience Publishers, New York, NY, 1971.
"Nonionic Surfactants", edited by M. J. Schick, Marcel Dekker, Inc., New York, 1967.

* cited by examiner

Primary Examiner—Kelechi C. Egwim
(74) Attorney, Agent, or Firm—Dean M. Harts

(57) ABSTRACT

The invention provides a process for removing steam-volatile fluorinated emulsifiers in their free acid form, from aqueous fluoropolymer dispersions. The process comprises adding a nonionic emulsifier, to the aqueous fluoropolymer dispersion and, at a pH-value of the aqueous fluoropolymer dispersion below 5, removing steam-volatile fluorinated emulsifier by distillation until the concentration of steam-volatile fluorinated emulsifier in the dispersion reaches the desired value.

17 Claims, No Drawings

METHOD OF MAKING AN AQUEOUS DISPERSION OF FLUOROPOLYMERS

The present invention relates to a process for preparing aqueous dispersions of fluoropolymers which are substantially free from fluorine-containing emulsifiers. For the purposes of the present invention, "substantially free" means a content of less than 100 ppm, preferably less than 50 ppm, particularly preferably less than 25 ppm, and in particular less than 5 ppm.

A process for preparing fluoropolymer dispersions of this type has been disclosed in WO 00/35971. In the process disclosed there, the fluorine-containing emulsifier is removed using anion-exchange resins. The emulsifier is practically quantitatively removed.

In the process according to the present invention, the high volatility of fluorinated emulsifiers is utilized in aqueous dispersions at pH<5, in particular at pH<4. At these pH values the emulsifier can be removed completely by steam distillation. High volatility is a feature in particular of fluorine-containing alkanecarboxylic acid emulsifiers, in particular perfluorooctanoic acid (PFOA), which is frequently used in aqueous emulsion polymerizations to produce fluoropolymers. Fluorinated emulsifiers which instead of the carboxyl group have other dissociable groups, such as $SO_3H$ and $SO_2H$, are not sufficiently steam-volatile in the form of the free acid and cannot advantageously be removed by the novel process. To remove emulsifiers of this type the anion-exchange process is generally more suitable.

Polytetrafluoroethylene (PTFE) dispersions are widely used in the coating industry, since the coatings have a unique combination of performance characteristics, such as release properties, good weathering resistance and nonflammability. They are mainly used for coating kitchen equipment, such as cookware and bakeware, chemical apparatus and glass fabrics. In many applications of this type the dispersions are applied using relatively high solids contents, for example up to 70% by weight. These concentrated dispersions are mainly stabilized with nonionic emulsifiers used in colloid chemistry, such as alkylarylpolyethoxy alcohols and alkylpolyethoxy alcohols.

There are in principle two different polymerization processes for preparing fluoropolymers, namely suspension polymerization, which gives polymer granules, and emulsion polymerization, which gives an aqueous colloidal dispersion. The present invention relates to emulsion polymerization, and to the resultant dispersions and their use.

In principle there are two steps in the preparation of dispersions of this type, namely polymerization and raising the solids concentration, i.e. upconcentrition.

Polymers which are obtainable by aqueous emulsion polymerization include homopolymers not processable from the melt, for example PTFE; "modified" polymers, for example a polymer with more than about 99 mol % of tetrafluoroethylene (TFE) and an amount of one or more comonomers which is so low that the product retains its "not processable from the melt" character; low-molecular weight "micropowder" dispersions which are processable from the melt; and copolymers, for example fluorinated thermoplastics or fluoroelastomers. The fluorinated thermoplastics include copolymers which are composed mainly of TFE and one or more comonomers in an amount necessary to make the product processable from the melt, for example from 1 to 50 mol %, preferably from 1 to 10 mol %. Customary fluoromonomers, besides TFE, are trifluoroethylene, vinylidene fluoride (VDF), other fluorinated olefins, such as chlorotrifluoroethylene (CTFE), in particular perfluorinated olefins having from 2 to 8 carbon atoms, such as hexafluoropropene (HFP), fluorinated ethers, in particular perfluorinated vinyl alkyl ethers whose alkyl moieties have from 1 to 6 carbon atoms, for example perfluoro (n-propyl vinyl) ether (PPVE). VDF may also be polymerized as a homopolymer. Other comonomers which may be used are nonfluorinated olefins, such as ethylene or propylene. The resultant dispersions of polymers which are processable from the melt or not processable from the melt generally have a solids content of from 15 to 30% by weight. To achieve the abovementioned high solids content for application as a coating, and advantageously also for storage and transport, the solids content has to be increased by raising the concentration. Examples of methods used for this are raising the concentration thermally (thermal upconcentration) as in U.S. Pat. No. 3,316,201, decanting (U.S. Pat. No. 3,037,953) and ultrafiltration (U.S. Pat. No. 4,369,266 and U.S. Pat. No. 5,219,910).

In the case of fluoroelastomers or amorphous fluoropolymers, which have a molecular weight less than 150,000, preferably less than 100,000, there is no need to add a nonionic emulsifier because these polymers normally have enough polar endgroups (e.g., $COO^-$, $SO_3^-$, $O-SO_3^-$) to stabilize the latex particles. Acidified aqueous dispersions can directly be distilled to obtain elastomer dispersions with significantly reduced APFO-levels (e.g., <50 ppm) and with solid contents of >50%. These dispersions can be used without modification, for example, for coating applications. The PFOA-reduced elastomer dispersions are also easier to coagulate, i.e., one needs less salt to coagulate in the work-up to obtain solid raw gums.

The known emulsion polymerization mostly takes place within a pressure range from 5 to 30 bar and within a temperature range from 5 to 100° C. as described in EP-B-30 663, for example. The polymerization process for preparing PTFE dispersions substantially corresponds to the known process for preparing fine resin powders, known as paste product (U.S. Pat. No. 3,142,665). The polymerization process for preparing copolymers, such as dispersions of fluorinated thermoplastics, corresponds to the process for preparing these materials in the form of melt pellets.

In all of these emulsion polymerizations an emulsifier is required which does not disrupt the polymerization by chain transfer. These emulsifiers are termed nontelogenic emulsifiers (U.S. Pat. No. 2,559,752). Use is mainly made of PFOA (for example n-PFOA, CAS No. 335-67-1) in the form of ammonium and/or alkali metal salts. However, the abbreviation PFOA when used in the text below is not intended to exclude other fluorinated emulsifiers, as long as they are steam-volatile, i.e., capable of being distilled. The content of this emulsifier is generally within the range from 0.02 to 1% by weight, based on the polymer.

Occasionally, other fluorinated emulsifiers are used. For example, EP-A-822 175 describes the use of salts of $CH_2$-containing fluorocarboxylic acids for the emulsion polymerization of TFE. WO-A-97/08214 describes the use of 2-perfluorohexylethanesulfonic acid or salts thereof for TFE polymerization.

U.S. Pat. No. 2,559,752 describes other fluorinated emulsifiers, but these have not been widely used since their volatility is low.

One of the greatest advantages of PFOA is its high volatility. PFOA is a very effective emulsifier and is practically indispensible due to its inertness in the polymerization reaction. However, PFOA is not biodegradable.

It is known that PFOA can be removed from exhaust gases (EP 731 081), and removed from wastewater (U.S. Pat. No. 4,282,162, WO 99/62830 and WO 99/62858).

In the techniques listed above for raising concentration, a substantial quantity of the PFOA remains in the polymer dispersion, even in the case of ultrafiltration or removal by decanting using a 100-fold excess of the nonionic emulsifier.

For example, in the ultrafiltration of U.S. Pat. No. 4,369,266 about 30% of the initial PFOA content remains in the dispersions as offered on the market. In specific cases the residual PFOA content can be reduced to about 10%, but the process is generally not cost-effective: achieving a reduction of this type requires addition of water and of a nonionic emulsifier to the dispersion whose solids concentration is to be raised. This gives unacceptably long process times.

Using previously known methods of thermal upconcentration of fluoropolymer dispersions, removal of PFOA by distillation is unsuitable, because thermal upconcentration proceeds at pH values >7. In fact, the dispersions would be colloid chemically unstable at pH values <7, and in particular PTFE dispersions coagulate completely at a pH<3 when exposed to shear forces at the low levels which are produced by agitation or transport. The colloid chemical instability of aqueous fluoropolymer dispersions can be eliminated as described in this invention by adding nonionic emulsifiers, for example those of alkylaryl polyethoxy alcohol type, such as ®Triton X 100, or those of alkylpolyethoxy alcohol type, such as ®GENAPOL X 080. TRITON is a trademark of Union Carbide Corp. and GENAPOL is a trademark of Clariant GmbH.

During subsequent use of PFOA containing dispersions, PFOA can pass into the environment, for example with the wastewater inevitably arising from cleaning the equipment, and into the atmosphere as aerosol. The latter emission is still more pronounced when coatings are produced, since PFOA and its ammonium salt are highly volatile. In addition, PFOA and its salts decompose by decarboxylation at the sintering temperatures normally employed, from 350 to 450° C., to give fluorinated hydrocarbons, which are known to contribute to the global-warming effect ("greenhouse effect").

The process of the present invention can produce coagulate-free high-solids dispersions which are substantially free from PFOA. This can be achieved by removing the PFOA from fluoropolymer dispersions in the presence of nonionic emulsifiers, for example when thermally upconcentrating the dispersion at a pH<5, in particular at a pH<4.

Fluoropolymer dispersions that can be used in the process of the invention include dispersions of homopolymers or copolymers made from one or more fluorinated monomers, such as TFE, VDF or CTFE, or from other fluorinated olefins having from 2 to 8 carbon atoms, from perfluorinated olefins having from 2 to 8 carbon atoms, such as HFP, from fluorinated ethers, in particular from perfluorinated vinyl alkyl ethers having alkyl moieties of from 1 to 6 carbon atoms, for example PPVE or perfluoro (methyl vinyl) ether. Other conomomers which may be used are nonfluorinated olefins, such as ethylene or propylene. The invention is intended to include dispersions of this type irrespective of whether the fluoropolymer is processable from the melt or not.

In raising the concentration of aqueous fluoropolymer dispersions, any slight tendency to coagulate should be avoided, since coagulum unacceptably impairs the industrial coating of final products, such as glass fabric or kitchen equipment.

According to one embodiment of the invention it has been found that adding from 0.5 to 10% by weight of nonionic emulsifiers, based on the actual solids content at pH≈1 allows the concentration to be raised industrially by thermal processes without formation of coagulate. It is preferable to add the nonionic emulsifiers to the dispersion before lowering the pH. The low pH can be produced by adding customary strong mineral acids, such as HCl, $H_2SO_4$, $HClO_4$, or $HNO_3$. $HNO_3$ is preferred, since the $NH_4NO_3$ that may be formed in a subsequent neutralization of the dispersion with $NH_3$ is noncorrosive, has adequate volatility and does not interfere with the sintering of the fluoropolymer. A cation-exchange process, as described in U.S. Pat. No. 5,463,021 for example, is also suitable for setting the desired pH and for preparing particularly pure dispersions.

A great advantage of the novel process is that it is very easy i.e. requires no significant capital expenditure, to integrate removal of the PFOA into thermal processes for raising the concentration.

A particular advantage of the process is that the surprisingly high volatility of the PFOA to be removed during the thermal process of raising concentration means that it is removed "before the water" during distillation of the dispersion whose concentration is to be raised. It appears that under these conditions PFOA forms an "azeotrope" with water which boils at about 99° C. at atmospheric pressure. This may be a PFOA hydrate which has low water-miscibility. This means that a dispersion substantially free from PFOA can be prepared by distilling off only from about 5 to 10% of the amount of water to be removed. A very high concentration of PFOA is present in this two-phase mixture which passes over first. This two-phase mixture forms with identical concentration ratios in each of the two phases, independent of the distillation pressure. At relatively low cost, therefore, the PFOA can be recycled and reused in the emulsion polymerization.

Processes for converting recovered PFOA into "polymerization grade" PFOA are described in U.S. Pat. No. 5,312,935, U.S. Pat. No. 5,442,097 and U.S. Pat. No. 5,591,877.

Nonionic emulsifiers are described in detail in "Nonionic Surfactants", M. J. Schick (ed.), Marcel Dekker, Inc., New York 1967.

The selection of the nonionic emulsifier is not critical. Examples of useful nonionic emulsifiers include alkylarylpolyethoxy alcohols, alkylpolyethoxy alcohols or any other nonionic emulsifier. This is a great advantage, since the formulation of the dispersions used remains substantially unaltered during the removal of PFOA from marketable dispersions.

No differences were found between various nonionic surfactants, such as those of alkylarylpolyethoxy alcohol type or of alkylpolyethoxy alcohol type, with regard to the effectiveness of PFOA removal by distillation.

The removal of PFOA is preferably carried out using crude or raw dispersions directly from the polymerization. Nonionic emulsifier is added to the crude dispersions, which generally have a solids content of from 15 to 30% by weight, the amount added being sufficient to give the dispersion stability during the subsequent upconcentration. An amount of from 0.5 to 15% by weight, preferably from 1 to 5% by weight of nonionic emulsifier is generally sufficient for this purpose. The percentages given are based on the solids content of the dispersion. If required, an appropriate addition of acid is then made to acidify the dispersion, which is preferably set to a pH of about 2. The setting of the pH must be below 5, and is preferably in the range from 1 to 3. The higher the pH, the greater the amount of water which has to be distilled off to remove the PFOA completely. Relatively high pH values may therefore in particular be used during upconcentration of the dispersion.

The removal of PFOA by distillation according to the invention may also readily be carried out using dispersions whose concentration has already been raised to a desired level, for example by ultrafiltration.

The removal of PFOA from the fluoropolymer dispersion is generally followed by a readjustement of the pH. Typically, the pH is increased after the treatment, by way of ammonia or other bases, such as NaOH, to give a pH>7, preferably 9. This may considerably increase the salt content of the dispersion and the result can adversely affect processing properties and the quality of coatings produced with the dispersion. It is therefore advantageous to use nitric acid for lowering the pH of the dispersion for the removal of PFOA because, as mentioned, the resultant salts from a subsquent readjustment of the pH of the dispersion, do not interfere.

The process of the invention may moreover be used for any crude fluoropolymer dispersion, e.g., dispersions directly from the polymerization process reactor.

The fluoropolymer dispersions produced with the process of the invention can be used in any coating application in which fluoropolymers have been used. In particular, the fluoropolymer dispersions produced with the process of this invention can be used to coat substrates, e.g. the dispersions can be used to coat metals including cookware and bakeware, fabrics, in particular glass fabrics and to coat chemical apparatus.

The examples below describe the invention in more detail without the intention to limit the invention thereto.

EXPERIMENTAL DATA

All percentages given are based on weight unless otherwise indicated.

Determination of PFOA

PFOA content of an anion-exchange dispersion can be determined quantitatively by the method of "Encyclopedia of Industrial Chemistry Analysis", Vol. 11, pp. 336–343, Interscience Publishers, New York, N.Y., 1971 and EP-A-194 690. In another method employed, the PFOA is converted into the methyl ester and the ester content analyzed by gas chromatography using an internal standard. In the latter method the detection limit for PFOA is 5 ppm. This method was employed in the examples below.

The nonionic surfactants used here were as follows:

NIS 1: octylphenoxypolyethoxyethanol (commercially available product TRITON X 100).

NIS 2: ethoxylate of a long-chain alcohol (commercially available product GENAPOL X 080).

Removal of PFOA:

Removal by distillation was carried out in a laboratory standard circulatory or loop evaporator. This apparatus permits the preparation of about 15 kg of dispersion with a solids content of from 50 to 60% in 6 hours. The evaporator was operated at atmospheric pressure, i.e. not in vacuo. Various fluoropolymer dispersions were tested at various pHs produced by appropriate addition of acid. The amount of PFOA in the dispersion was measured after the concentration of the dispersion had been raised. Finally, the dispersion with its concentration thus raised was utilized with $NH_3$ and studied for the presence of coagulate. None of the experiments shown in Table 1 revealed coagulate in amounts which adversely affect quality.

EXAMPLES 1–7

Fluoropolymer dispersions studied in Table 1:

1. PTFE dispersion with a solids content of 20% and a PFOA content of about 1500 ppm. (Examples 1–4)
2. FEP dispersion is an emulsion-polymerized fluoropolymer dispersion with a solids content of 25% and a PFOA content of about 2200 ppm. The fluoropolymer is a copolymer made from TFE and HFP at a level of 12% HFP. Example 5)
3. PFA dispersion is an emulsion-polymerized fluoropolymer dispersion with a solids content of 22% and a PFOA content of 1800 ppm. The fluoropolymer is a copolymer made from TFE and PPVE at a level of 3.9% PPVE. (Example 6)
4. THV dispersion is an emulsion-polymerized fluoropolymer dispersion with a solids content of 29% and a PFOA content of 1900 ppm. THV is a terpolymer made from TFE, HFP and VDF in a weight ratio of 20/25/55. (Example 7)

TABLE 1

| | Fluoropolymer dispersions | | | | | | |
|---|---|---|---|---|---|---|---|
| | PTFE | | | | FEP*) | PFA | THV**) |
| | 1 | 2 | 3 | 4 | 5 | 6 | 7 |
| Acid added | $H_2SO_4$ | HCl | HCl | $H_2SO_4$ | — | $H_2SO_4$ | — |
| pH | 2 | 1.5 | 3 | 2 | 2.3 | 2 | 1.5 |
| Nonionic emulsifier added | 5% NIS 1 | 9% NIS 1 | 5% NIS 2 | 5% NIS 2 | 5% NIS 2 | 5% NIS 1 | 5% NIS 1 |
| Solids content of treated dispersion | 55% | 53% | 54% | 58% | 50% | 50% | 54% |
| PFOA content of treated dispersion | <5 ppm | <5 ppm | <5 ppm | <5 ppm | <5 ppm | <5 ppm | <5 ppm |

*) Acid addition is unnecessary, since the dispersion has this pH directly from the emulsion polymerization
**) Cation-exchanged dispersion

EXAMPLES 8 AND 9

A commercially available PTFE dispersion which is marketed and used for metal coating, with a solids content of 59%, NIS 1 content of 9% and PFOA content of 1500 ppm, was subjected to a first stage of distillation in a simple laboratory distillation apparatus, that is to say that about 50 ml of water were "distilled off" per kg of dispersion. The pH was set at ≈2 by adding $H_2SO_4$ (Example 8) and $HNO_3$ (Example 9). The distillation was carried out at atmospheric pressure at 100° C. (Example 8) and at 40° C. and a correspondingly reduced pressure (Example 9). The measured PFOA content of the dispersions treated in this way was in all cases <5 ppm.

EXAMPLE 10 AND COMPARATIVE EXAMPLES A AND B

The experiments in the simple laboratory distillation apparatus of Examples 8 and 9 were carried out using the PTFE dispersion and varying the pH of the dispersion. The results are given in Table 2.

TABLE 2

| Example | A | B | 10 |
|---|---|---|---|
| Acid added | $H_2SO_4$ | $H_2SO_4$ | $H_2SO_4$ |
| pH | 6.5 | 5.0 | 4.2 |
| NIS 1 | 5% | 5% | 5% |
| PFOA content prior to treatment | 1500 | 1500 | 1500 |
| PFOA content after treatment | 1500 | 1500 | 1100 |

Under these conditions a pH<4 is useful for efficient removal of the PFOA. The PTFE dispersion with pH set to 4 coagulates during the treatment of the invention in the absence of a nonionic emulsifier. This also applies to the other fluoropolymer dispersions shown in Table 1. Nonionic emulsifiers therefore have to be added.

EXAMPLE 11

An APS-initiated polymer dispersion (the dispersion originally has 3600 ppm PFOA) of TFE (57%), Propylene (14%) and $VF_2$ (29%) having a solid content of 25%, Mooney viscosity ML (1+10 @ 121° C.)=45 was run through a cation exchanger; the pH of the dispersion was pH=1.5. This dispersion was distilled in a standard distillation apparatus under normal pressure until a solid content of 50% was obtained. The dispersion showed no coagulum and the APFO-level was <10 ppm.

What is claimed is:

1. A process for removing steam-volatile fluorinated emulsifiers in their free acid form, from aqueous fluoropolymer dispersions, said process comprising adding a nonionic emulsifier to said aqueous fluoropolymer dispersion and, at a pH-value of said aqueous fluoropolymer dispersion below 5, removing steam-volatile fluorinated emulsifier by distillation until the concentration of steam-volatile fluorinated emulsifier in the fluoropolymer dispersion reaches the desired value.

2. The process as claimed in claim 1, wherein said pH-value of said aqueous fluoropolymer dispersion is from 1 to 3.

3. The process as claimed in claim 1 or 2, wherein a strong mineral acid is used to set said pH.

4. The process as claimed in claim 3, wherein the acid is nitric acid.

5. The process according to claim 1 or 2 wherein said pH is set through cation-exchange.

6. The process of claim 1, wherein said aqueous fluoropolymer dispersion is a crude dispersion obtained from the polymerization process producing the fluoropolymer.

7. The process of claim 1, wherein water is removed from the dispersion by distillation, thus raising the concentration of the dispersion.

8. Process according to claim 1 wherein said process further comprises increasing the pH of said aqueous fluoropolymer dispersion to more than 7 subsequent to said removal of steam-volatile fluorinated emulsifier.

9. The process of claim 1 further comprising coating a substrate with the aqueous fluoropolymer dispersion.

10. A process according to claim 1 wherein the fluoropolymer is a fluoroelastomer.

11. A process according to claim 10 wherein the fluoroelastomer has a molecular weight less than 150,000.

12. A process according to claim 11 wherein the molecular weight of the fluoroelastomer is less than 100,000.

13. An aqueous dispersion made according to the process of claim 10 wherein the dispersion contains less than 50 ppm fluorinated emulsifier after distillation.

14. A process according to claim 1 wherein the aqueous fluoropolymer dispersion has been upconcentrated prior to removal of fluorinated emulsifiers.

15. A method of treating a substrate to provide a feature thereto selected from the groups consisting of antistickiness, weatherability, and noninflammability comprising contacting the substrate with a fluoropolymer prepared according to claim 1.

16. A method according to claim 15 wherein the substrate is metal.

17. A method according to claim 15 wherein the substrate is fabric.

* * * * *